United States Patent [19]
Hubbard, Jr.

[11] Patent Number: 5,159,498
[45] Date of Patent: Oct. 27, 1992

[54] ACTIVE MIRROR ASSEMBLY

[75] Inventor: James E. Hubbard, Jr., Derry, N.H.

[73] Assignee: The Charles Stark Draper Laboratory, Inc., Cambridge, Mass.

[21] Appl. No.: 486,955

[22] Filed: Mar. 1, 1990

[51] Int. Cl.$^5$ .......................... G02B 7/18; G02B 1/12; G01B 9/02

[52] U.S. Cl. ..................... 359/847; 359/11; 359/291; 359/900; 356/353

[58] Field of Search ............... 350/607, 487, 358, 360, 350/3.82, 3.83, 572, 167; 359/1, 10, 11, 15, 32, 34, 245, 247, 254–271, 290–300, 846–849, 900; 356/353–390

[56] References Cited

U.S. PATENT DOCUMENTS

| | | | |
|---|---|---|---|
| 3,508,814 | 4/1970 | Aas | 350/487 |
| 3,923,400 | 12/1975 | Hardy | 350/572 |
| 4,093,351 | 6/1978 | Perkins et al. | 359/847 |
| 4,118,106 | 10/1978 | Leith | 350/3.82 |
| 4,688,941 | 8/1987 | Philbert | 356/353 |
| 4,736,132 | 4/1988 | Culp | 350/487 |
| 4,773,748 | 9/1988 | Shil et al. | 350/607 |
| 4,946,280 | 8/1990 | Horton | 356/353 |
| 5,026,977 | 6/1991 | Hubbard, Jr. | 356/353 |

OTHER PUBLICATIONS

"The membrane mirror as an adaptive optical element" Tellin et al, J. Opt. Soc. Ann. vol. 67, No. 3, Mar. 1977, pp. 399–406.

"Wavefront compensation error due to finite connector-element size" Hudgin, J. Opt. Soc. Ann. vol. 67, No. 3, Mar. 1977, pp. 393–395.

"Monolithic piezoelectric mirror for wavefront correction" Cone et al, Applied Physics Letters, vol. 25, No. 5, Sep. 1974, pp. 311–313.

Kokorowski, S. A., "Analysis of Adaptive Optical Elements made from Piezoelectric Bimorphs," J. Optical Society of America, vol. 69, No. 1, Jan. 1979, p. 181.

Sato, T., Ishikawa, H., Ikeda, O., Nomure, S. and Uchino K., "Deformable 2-D Mirror Using Multilayered Electrostrictors,"Applied Optics, vol. 21, No. 20, Oct. 1982, p. 3669.

Sato, T., Ueda, Y., and Ikeda, O., "Transmission-type PVDF 2-d Optical Phase Modulator," Applied Optics, vol. 20, No. 2, Jan. 1981, p. 343.

Sato, T., Ishida, H., and Ikeda, O., "Adaptive PVDF Piezoelectric Mirror System," Applied Optics, vol. 19, No. 9, May 1980, p. 1430.

Sato, T., Ishikawa, H. and Ikeda, O., "Multilayered Deformable Mirror Using PVDF Films," Applied Optics, vol. 21, No. 20, Oct. 1982, p. 3664.

Koshida, N. and Yoshida, S. "Secondary Electron Emission from Polyvinylidene Fluoride (PVDF) Film," Jpn. J. Appl, Phys, vol. 22, (Nov. 1983) No. 11, p. 1744.

Hardy, John W., "Active Optics: A New Technology for the Control of Light" Proc. IEEE, vol. 66, No. 6, Jun. 1978, pp. 651–697, esp pp. 657, 683–684.

Primary Examiner—Bruce Y. Arnold
Assistant Examiner—Thong Neuyen
Attorney, Agent, or Firm—Lahive & Cockfield

[57] ABSTRACT

A mirror and system for wavefront control includes a piezoelectrically active pellicle with a conductive front mirror surface, and an electron gun for depositing charge on the rear surface of the pellicle. The pellicle is formed of facing plies of polyvinylidene fluoride having opposite poling, so that efficient bimorph actuation is achieved while maintaining substantially constant pellicle thickness and stable x-y planar position coordinates. A phase corrector plate provides a fixed flatness correction for irregularities of the mirror surface, and an initial charge distribution is applied to achieve a reference mirror contour. Potentials above and below a front surface reference potential, and different frame rates, are achieved by controlling the electron energy to selectively charge by primary or secondary charging processes. A feedback system may establish the initial reference contour, and thereafter effect real time wavefront adjustment of a beam reflected from the front mirror surface.

8 Claims, 5 Drawing Sheets

ACTIVE MIRROR ASSEMBLY

BACKGROUND OF THE INVENTION

The present invention relates to active elements which are used to control an optical wavefront by altering its phase characteristics. Such elements are useful when it is desired, for example, to precisely adjust an optical path length in order to produce a desired wavefront correction. Among prior art devices, there exist deformable mirror assemblies in which a plurality of discrete piezoelectric actuation devices are attached to a mirror substrate, which may be either a monolithic mirror or a segmented set of mirrors.

To use such a prior art device to control a wavefront, one computes a desired continuous surface contour of a deformable mirror based on a set of performance requirements, and then determines a set of control signals to actuate some of the discrete piezoelectric actuator devices so as to deform the mirror into a shape which approximates the desired surface contour. The smoothness of achievable surface shapes depends in part on the number of actuators and their influence functions. Such deformable mirror systems are complex, expensive, bulky and have severe spatial and temporal bandwidth performance limitations.

Accordingly, it is desirable to provide an improved active mirror assembly.

SUMMARY OF INVENTION

In accordance with the present invention, one or more of the above drawbacks are overcome and a continuously variable active mirror assembly is achieved.

This is accomplished by providing a conductive mirror surface on one side of a piezoelectrically active bimorph membrane, and providing a charge distribution on the other side of the membrane to vary the shape of the mirror surface and thus to change the phase of a wavefront striking the mirror. A phase corrector plate provides an initial flatness correction to compensate for surface irregularity, a reference potential is applied to the conductive mirror side, and an electron beam deposits the two-dimensional charge distribution on the other side of the membrane. In a preferred embodiment, the membrane consists of two piezoelectrically active lamella of polyvinylidene fluoride (PVDF) joined together along a common face. Each layer has substantially identical thickness, electrical conductivity and piezorestrictive characteristics, but the two sheets are of opposite polarity. Thus when one sheet expands in the plane of the sheet, the other sheet contracts, and vice-versa.

With this construction, upon the application of a charge, the bimorph membrane maintains a constant front-to-back thickness as each layer undergoes an opposing change in its thickness dimension, while the center plane and front surface shift slightly in the thickness direction. Further, the opposing in-plane changes of dimension achieved in this bimorph construction result in substantial localized out-of-plane curvatures. Thus, the mirror is ideally suited to effect phase correction of a wavefront striking the mirror surface.

BRIEF DESCRIPTION OF DRAWINGS

These and other features of an active mirror assembly and system according to the invention will be understood from the following description with reference to the drawings, wherein.

DETAILED DESCRIPTION OF INVENTION

Figure 1:
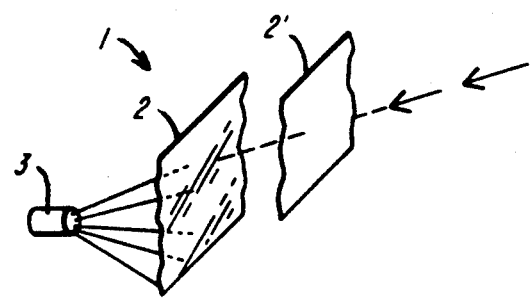
FIG. 1 shows in broad scheme an active mirror system according to the invention.

In its broad lines as shown in FIG. 1, the invention is realized in a system 1 wherein a piezoelectrically active membrane 2 is secured in a nominally planar position in an instrument, and a two-dimensional charge distribution is formed on the back surface of the membrane 2 by a charge control unit 3. The front surface is a reflective metallized surface, and is grounded. The charge distribution determined by unit 3 thus results in locally varying changes in the dimensions and mechanics of the membrane due to differences in piezoelectric effects responsive to the local potentials created across the membrane. The position of the reflective surface varies correspondingly. The entire membrane is preferably fixedly secured about its edges to a frame, like the head of a drum, so that the membrane boundary is fixed and the actual changes in position of the front surface constitute small excursions from a nominally planar surface. A hologram phase corrector plate 2' provides a static or initial flatness correction, and the charge distribution is thereafter controlled to first attain a more precise flatness reference contour, and then to achieve localized displacement of the mirror surface for dynamic phase correction of light reflected from the mirror.

Figure 2:
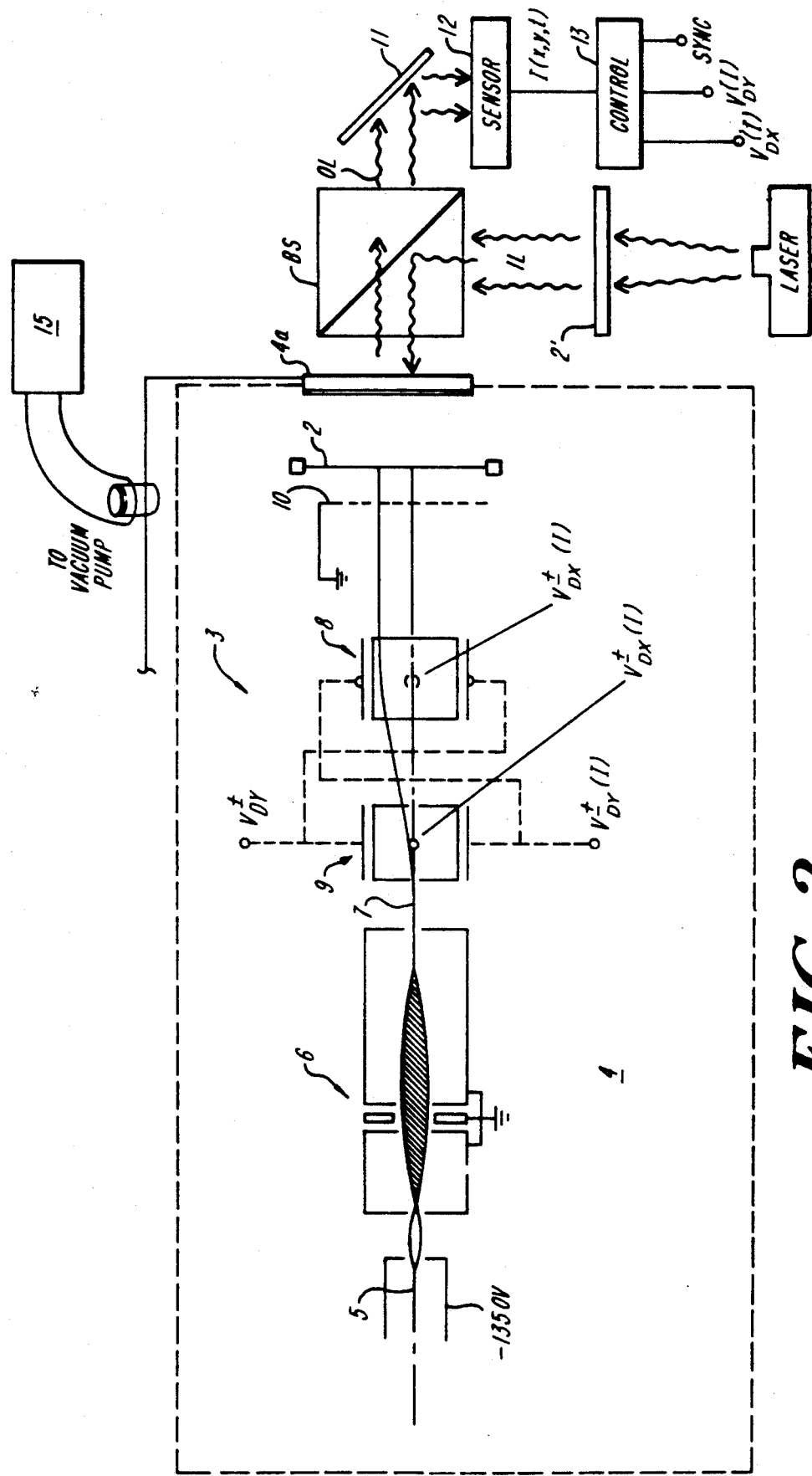
FIG. 2 shows an embodiment of a system including an electron beam charge deposition device.

FIG. 2 shows a representative system in which an electron gun apparatus serves as the charge control unit 3. In this embodiment, the membrane is located within a vacuum chamber 4, and a cathode assembly 5 produces an electron flux which is collimated and accelerated by an Einzel lens assembly 6 to form a thin beam 7. Beam 7 is deflected by x- and y- deflection yokes 8,9 to deposit a desired charge distribution on the piezoelectric membrane 2. A control grid or screen 10 located close to membrane 2 modulates the surface change build-up. As illustrated, the control grid or screen 10 is preferably maintained, at or near ground potential. A vacuum source 15 maintains a hard vacuum in the chamber 4 between the electron gun assembly 3 and the membrane 2. Input light IL enters the chamber and output light exits the chamber through a window 4a. In general, it is desired to form a particular spatially varying charge and electric field on the membrane, which may include regions of positive, negative and zero charge.

In the embodiment illustrated in FIG. 2, the electron gun emits electrons at a low potential ($-1350$ V) which are accelerated toward the screen. The voltage on the control grid or screen 10 or the cathode potential may, of course, be varied, so that the electrons passing the screen have any desired kinetic energy range. With the mirror membrane of the prototype embodiment, a 1350 V electron beam was found to provide a relatively slow charging speed, determining a low "frame rate" at which the mirror contours could be changed.

More generally, to achieve a controlled level of negative charge at a site on the membrane, the electron gun may be aimed by the x- and y-deflection yokes and controlled to deposit a calculated amount of low energy electrons directly at the site. The development of charge by landing low-energy primary electrons in this matter is known as cathode potential stabilization. If it is desired to achieve a localized positive potential, the gun may be controlled to deposit electrons in the region, of a high enough energy to eject secondary electrons from the region by scattering processes, thus resulting in a net positive charge. Depositing charge by this mechanism of secondary scattering is known as anode potential stabilization. The invention contemplates that both mechanisms are preferably used to actuate the membrane and achieve a desired (+) and (−) charge distribution across the membrane. A cold cathode electron source is used to avoid pyroelectric effects on the membrane.

In different embodiments, applicant contemplates that the electron charging system operates in one of several different charging modes, to either produce a very stable charge pattern, or to quickly produce a very high level of charge.

Returning to FIG. 2, a phase correction plate 2' is located ahead of the mirror membrane. Phase correction plate 2' is shown located outside of the vacuum chamber for clarity of illustration, and positioned in the path of input light IL directed at mirror membrane via a beamsplitter BS. The input light is reflected as an output light beam OL which is intercepted by light collection optics 11, shown as a turning mirror by way of example. The collection optics direct the output light OL at a wavefront sensor 12 such as a photodetector, the output of which is processed by control circuits 13 to provide time varying feedback signals which control the position and energy of the electron beam 7 in a manner to effect desired changes in mirror surface position.

In one mode, to achieve a stable charge control regimen, applicant contemplates operating the electron gun in a grid stabilization mode and charging with an electron beam which has an energy at the peak of the secondary electron yield curve of the PVDF mirror material. The values of this curve are known, for example, from FIG. 1 of Koshida et al, *Secondary Electron Emission form Polyvinylidene Fluoride (PVDF) Film*, Jpn. J. Appl. Phys. vol. 22 (1983), No. 11 p. 1744 and may be further defined by direct measurement of the particular PVDF film employed. By landing primary electrons of approximately 250 V energy, a high secondary electron yield of 2.5 is obtained, leading to fast charging and readily quantified distribution of charge.

In other modes of operation, discussed briefly above, the primary electrons are deposited at a crossover voltage level at which the secondary electron yield is approximately unity. This mode allows high charge voltage levels to be achieved, resulting in substantial mirror displacements, but can require a longer time to charge the membrane, thus providing a lower frame rate for mirror control.

Finally, it is also contemplated that in another mode, the primary electrons are deposited at a voltage between 0.3 and about 0.7 KV. In this range, the secondary emission is high, but varies without an extremum, so that while fast charging with high secondary yields and relatively higher voltages are obtained, the charging processes are relatively unstable, and more complex control signal processing is necessary to derive the required electron beam control parameter values for achieving a given charge distribution on the mirror.

Figure 3:
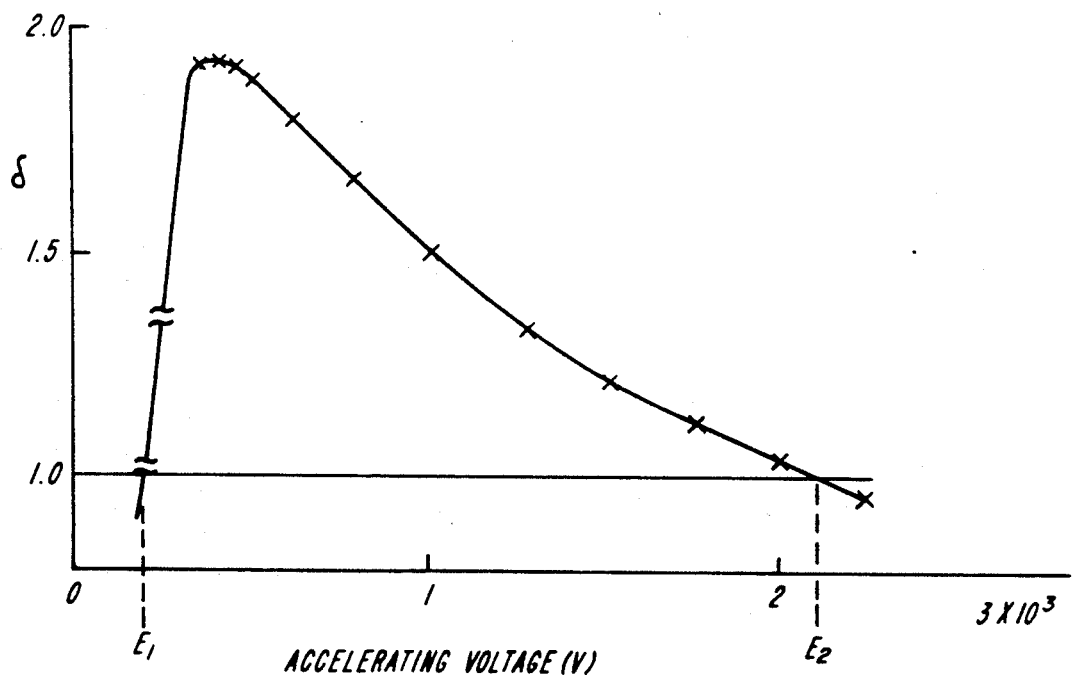
FIG. 3 is a graph of secondary electron emission characteristics.

FIG. 3 shows the general form of the secondary electron emission coefficient $\delta_S$ with electron energy. It will be seen that for electron energies between approximately 200 e.v. and 1500 e.v. there is substantial secondary electron generation. This mechanism is advantageously used to develop locally positive charge regions. Thus, it will be understood that the electron gun is preferably controlled, both as to the energy and number of delivered electrons, to achieve a spatially varying charge distributed about a reference potential of the mirror face. The mirror thus acts as one pole electrode of the PVDF film.

Figure 4A:
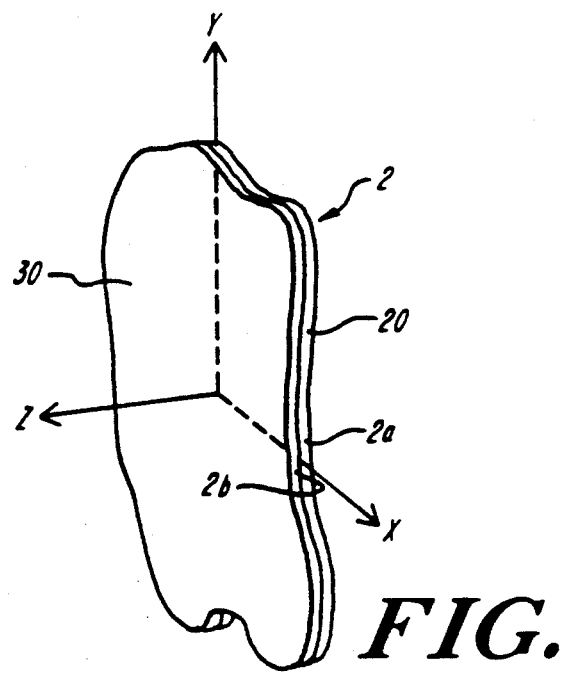
FIG. 4A shows a perspective view.

FIG. 4A shows a perspective view of a portion of the preferred active pellicle mirror 2 of a preferred embodiment. In this embodiment, two sheets of material 2a, 2b are joined along a common inner surface to form a bimorph, with the outer surface 20 of sheet 2a forming the metallized mirror surface of the active mirror assembly, and the outer surface 30 of sheet 2b facing inwardly toward the electron gun. FIGS. 4B, 4C and 5A, 5B illustrate the piezoelectric behavior of sheets 2a, 2b and of the bimorph assembly, respectively.

Figure 4B:
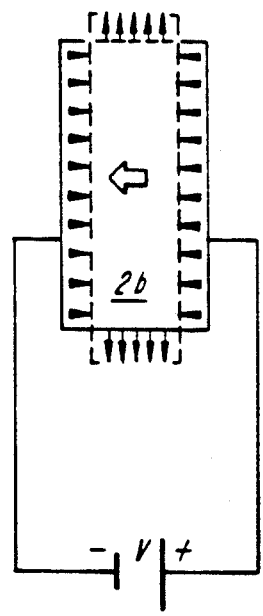
FIGS. 4B and 4C show sectional views, of a prior art bimorphic active mirror element suitable for the systems of FIGS. 1 and 2.
Figure 4C:
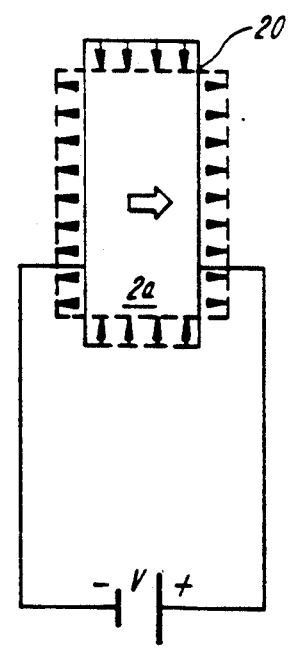

As shown in FIG. 4B, a first layer of the two-layer film bimorph, taken as layer 2b for purposes of illustration, undergoes a thicknesswise contraction and in-plane expansion when subjected to a voltage potential across its opposite surfaces. The poling direction of the layer is indicated by the large arrow. The second layer 2a shown in FIG. 4C undergoes a thicknesswise expansion and an in-plane contraction when subjected to the same potential. Its poling direction is opposite to that of layer 2b, and may be obtained by simply turning a sheet of the first layer material upside down before joining (e.g., solvent binding) the two layers.

Figure 5A:
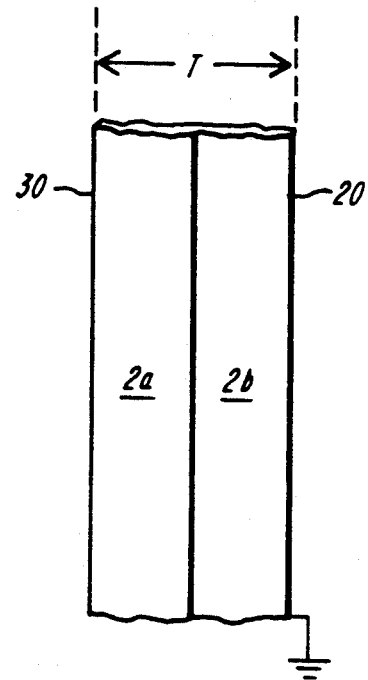
FIGS. 5A and 5B show the mirror in its relaxed and actuated states.
Figure 5B:
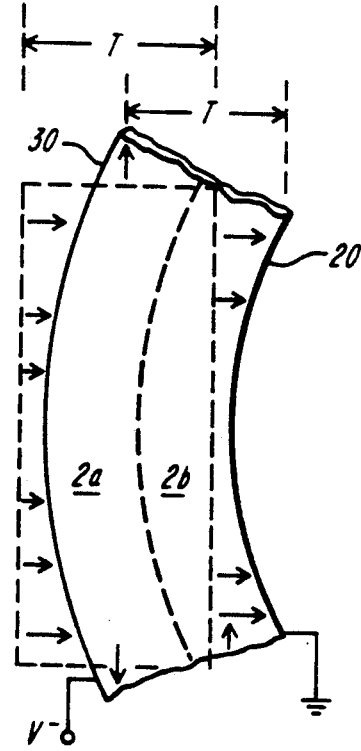

FIG. 5A shows a portion of the two layer pellicle mounted in the same orientation as the active mirror of FIGS. 1, 2 and 4A, with the layers 2a, 2b identified as above. In its zero-potential or relaxed state, the pellicle assumes a planar aspect in a relaxed position with a thickness T. Mirror face 20 is nominally flat as shown in FIG. 5A, and serves as a conductive ground. When the inner face 30 is charged to a net voltage with respect to face 20, the charged region of the bimorph deforms to a concave (or convex) shape as shown in FIG. 5B. Nonetheless, the pellicle maintains a substantially constant thickness T due to the opposite changes in the thickness of the two layers; it also maintains substantially identical x- and y- coordinates in the plane of the membrane due to the opposite shifts of the two attached sheets. The bimorphic sheet construction of a membrane maintained under tension in a nominal plane is thus ideally suited to the generation of precisely-controlled sub-wavelength displacements for wavefront correction.

The terms "relaxed" and "zero potential state" as used above, are to be considered generally as referring to a reference or initial state. In practice, the membrane assembly is only approximately flat and is characterized by a much greater degree of surface irregularity than is generally acceptable in a precision optical component. Applicant's intended mirror use is to apply phase adjustments to a wavefront reflected from the mirror, and accordingly the membrane assembly, which cannot be optically worked to achieve flatness, is corrected to result in an effectively flat profile by placing a phase corrector hologram plate 2' in front of it. The phase hologram plate has a phase delay distribution complementary to the surface irregularities of the mirror, and is recorded by exposing AGFA 8E75 holographic plate simultaneously to a reference coherent plane wave and a wave reflected from the mirror.

The hologram plate is then reversed and placed in the optical path between a plane wavefront and the mirror to provide a phase conjugate corrected wavefront. This wavefront is reflected from the mirror as a nominally plane wavefront. Thereafter, further local perturbations and irregularities of the membrane which evolve over time may be corrected by an additional step of initializing the charge distribution to provide an initial low-level charge distribution on the membrane in an amount which further corrects the mirror contour such that the reflected wavefront is flat. In operation, the charge control unit 3 then varies the charge distribution with respect to this initial reference distribution to effect real-time changes in the reflected wavefront of a higher temporal frequency.

Figure 6:
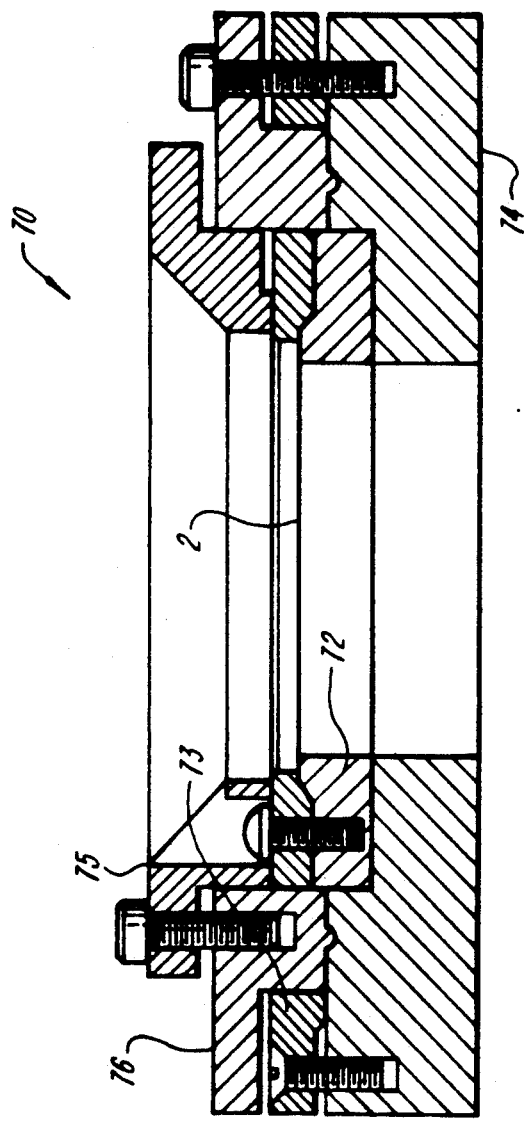
FIG. 6 shows mirror mounting details.

FIG. 6 shows the construction of the active mirror mounting assembly 70 of one embodiment. As shown, assembly 70 mounts the active mirror membrane 2 in a base 72 and mounting ring 73, on a housing or fixture 74 for location in the vacuum chamber. The various elements of the structure operate to hold the pellicle in a taut planar state with a spatially-fixed boundary. First and second ring clamps 75, 76 clamp the base 72 and mirror ring 73, respectively, to form a rigid mechanical assembly positioned in the vacuum chamber.

In a prototype apparatus, the film employed for fabricating the mirror was a PVDF film 27 microns thick sold by Marconi GEC Systems. Two sheets of this film were bonded together to form a 54 micron thick bimorph. The mirror surface was a gold metal coating approximately 200 Angstroms thick, which served as a conductive and reflecting layer of the mirror structure. This type of film has been previously employed as the sensing diaphragm in a hydrophone and it was chosen as a convenient material for building the prototype instrument. The overall thickness of 54 microns was considered a reasonable dimension for a proof-of-principal instrument, but applicant considers that thinner membranes may be desirable to achieve greater mechanical responsiveness, and also to provide more appropriate charge actuation levels for varying the mirror contours. As the PVDF material changes its mechanical characteristics over time, due to solvent loss or electron-induced cross-linking, the control circuitry may provide different levels of charge to achieve a desired contour.

This completes a description of representative embodiments of the present invention. The invention being thus disclosed, various modifications within the spirit and scope of the invention will occur to those skilled in the art, and all such modifications are intended to be covered by the claims appended hereto.

What is claimed is:

1. An active mirror assembly for forming a spatially-varying surface contour to reflect and change a wavefront of light directed thereat, such assembly comprising:
   a piezoelectrically active membrane formed of a deformable material and having first and second sides with an electrically conducting and reflective mirror surface formed on said first side;
   means for maintaining said first side at a reference potential;
   mounting means for securing said membrane in a fixed mounting plane, the reflective mirror surface being characterized by a surface irregularity such that light reflected from the mirror surface undergoes an irregular phase delay distribution when the membrane is in a relaxed or zero potential state;
   a phase correction plate in front of said mirror surface, said phase correction plate being holographically formed for introducing into light directed at the mirror surface a two-dimensional phase delay distribution complementary to the irregular phase delay distribution due to the surface irregularity of said reflective mirror surface; and
   means for projecting charge at said second side to develop a two dimensional varying charge distribution effective to piezoelectrically deform said membrane in relation to the fixed mounting plane.

2. An active mirror assembly according to claim 1, wherein said piezoelectrically active membrane is formed of plural lamina of piezoelectric material, adjacent lamina having opposite poling.

3. An active mirror assembly according to claim 2, wherein said piezoelectric material is a polyvinylidene fluoride (PVDF).

4. An active mirror assembly according to claim 1, wherein said reflective mirror surface is a grounded conductive coating under one micron thick.

5. An active mirror assembly according to claim 1, wherein said means for projecting charge includes means for varying the energy of electrons striking said second side to develop a charge distribution above and below said reference potential.

6. A light reflecting mirror assembly comprising a bimorph pellicle consisting of:
   first and second piezoelectrically active film layers of opposing polarity joined together along a common surface, each layer thereby having one outer surface, an electrically conductive reflective mirror coating on the outer surface of one said layer; and
   means for introducing a two-dimensional phase delay distribution complementary to a phase distribution produced in light by reflection from an irregular surface of the reflective coating on the outer surface.

7. A method of altering a light wavefront comprising the steps of:
   directing the light wavefront at a front surface of a piezoelectrically active membrane having a reflective and electrically conductive mirror coating formed on said front surface which is effective to maintain said surface at a reference potential;
   further directing the light wavefront at a phase corrector plate to introduce a phase delay in the light wavefront complementary to phase changes introduced by reflection at said mirror coating from surface irregularities of the conductive mirror coating when said membrane is in a relaxed or zero-potential state; and
   directing an electron beam at a rear surface of said membrane to develop a varying charge distribution on said membrane, whereby the front surface assumes a defined contour for altering the phase distribution of the light wavefront directed at said front surface.

8. The method of claim 7, further comprising the steps of;
   directing the altered wavefront to a photodetector to develop a time-varying signal representative thereof; and
   controlling the electron beam in accordance with said time varying signal.

* * * * *